Jan. 9, 1923.

C. G. McKINNEY.
MULTIPLE CONTROL LOCK FOR AUTOMOBILES.
FILED MAR. 24, 1922.

Inventor
Claude G. McKinney

By *Wm. B. Jaynes*

Attorney

Jan. 9, 1923. 1,441,866.
C. G. McKINNEY.
MULTIPLE CONTROL LOCK FOR AUTOMOBILES.
FILED MAR. 24, 1922.
2 SHEETS—SHEET 2.

Inventor
Claude G. McKinney

By Wm. S. Jaynes
Attorney

Patented Jan. 9, 1923.

1,441,866

UNITED STATES PATENT OFFICE.

CLAUDE G. McKINNEY, OF HENRIETTA, TEXAS.

MULTIPLE-CONTROL LOCK FOR AUTOMOBILES.

Application filed March 24, 1922. Serial No. 546,288.

*To all whom it may concern:*

Be it known that I, CLAUDE G. McKINNEY, a citizen of the United States, residing at Henrietta, in the county of Clay and State of Texas, have invented certain new and useful Improvements in Multiple-Control Locks for Automobiles, of which the following is a specification.

This invention relates to an automobile locking device in which the steering wheel will be locked against rotation when the engine is cut off, that is a locking device in which the ignition circuit can be broken only by locking the steering shaft.

This makes it impossible for a car to be parked, with engine stopped, without also locking the steering mechanism.

The invention consists in the novel features of construction and combination of parts hereinafter described, pointed out in the claims and shown in the accompanying drawings, in which:—

Figure 1:
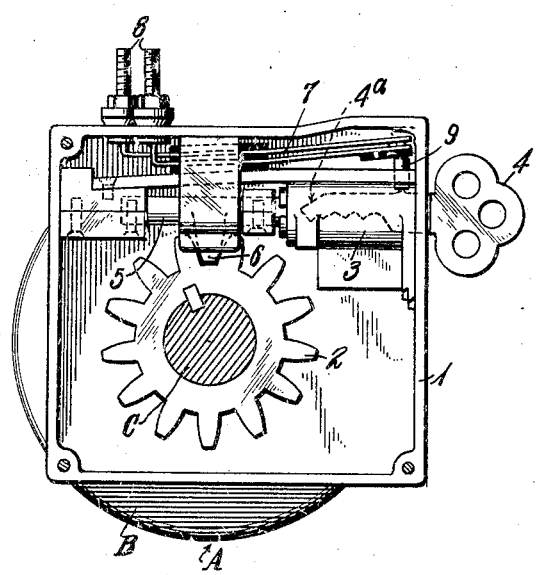
Figure 1 is a plan view of the device, a casing cover being removed, and a steering shaft being in section.

In the drawings A designates the internal gear casing, B the cap and C the steering shaft, parts common to a well known make of automobile. To the cap B is secured a lock casing 1. Within the casing and secured to the shaft C is a toothed wheel 2. A lock 3, of the pin type is arranged in a corner portion of the casing as shown, and is operated by a key 4, having a beveled end $4^a$. A shaft 5 is rigid with the rotatable barrel of the lock and carries a lug or tooth 6 at right angles to the shaft and adapted to engage the wheel 2 and lock the same against rotation. Spring contact plates 7 form parts of the ignition circuit 8. These plates are held in contact and the circuit closed by a pin 9 that is adapted to work transverse through the barrel of the lock and across the keyway.

The operation of the device is as follows:

When the engine is running the key 4 is in the lock and the pin 9 forced outwardly to close the circuit, and the steering wheel is unlocked, and in this position the key cannot be removed from the lock. The type of lock employed is one in which the key cannot be turned a complete rotation, but after making a one-half turn, must be returned to starting position to be withdrawn.

Figure 2:
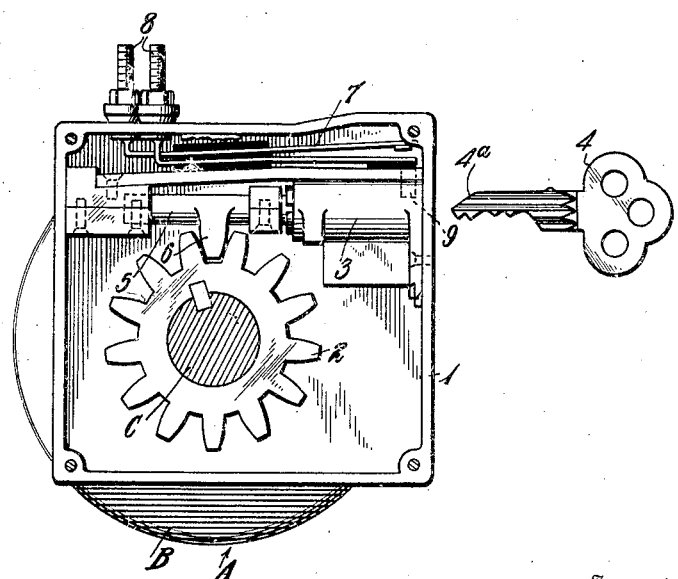
Figure 2 is a similar view a spring being broken away, and showing the position of the parts when the circuit is broken.
Figure 3:
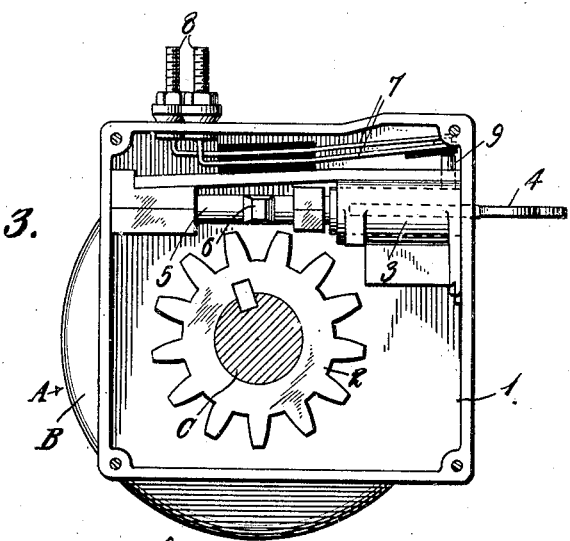
Figure 3 is a view similar to Figure 2 showing the position of the parts when the engine is running and the steering shaft is unlocked.
Figure 4:
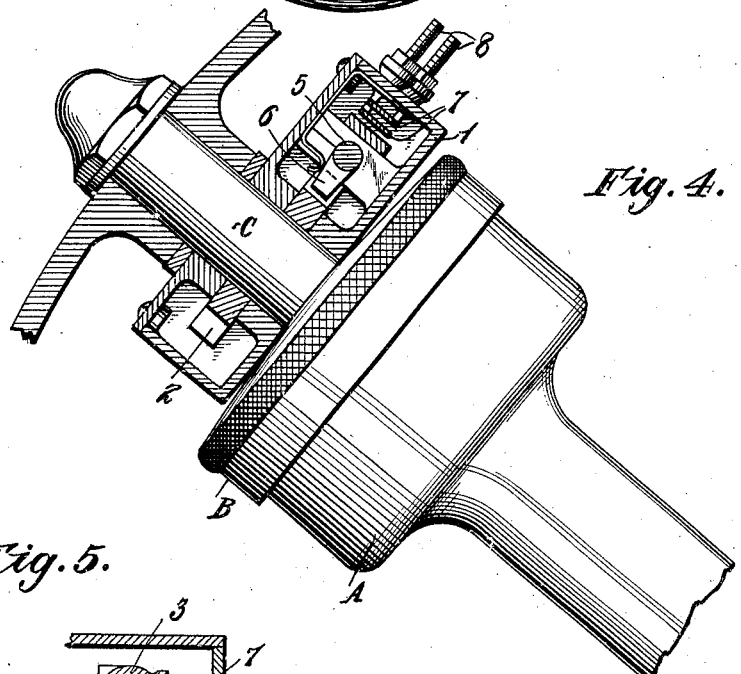
Figure 4 is a sectional side elevation showing the manner of attaching the lock in place.
Figure 5:
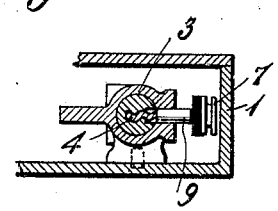
Figure 5 is a cross section through the lock barrel, and key, a circuit breaking pin being shown in side elevation.

In order to stop the engine therefore it is necessary to turn the key to the position shown in Figure 1, this locks the steering wheel by bringing the tooth 6 into engagement with the wheel 2, and then to break the circuit it is necessary to remove the key from the lock to let the pin drop through the barrel as shown in Figure 2. To start the engine the key is inserted and the beveled portion $4^a$ lifts the pin from the keyway. The inner end of the pin is rounder so that as the key is turned to close the circuit and unlock the steering wheel the pin rides up on the lock barrel, the barrel turning under it forcing the contact plates together.

It will be obvious from the description and drawings that the machine is always locked, against being steered or towed, when the engine is cut off, and the steering mechanism unlocked when the engine is running, and it cannot be left with the engine running and the key in the lock.

What I claim is:

1. In a device of the kind described, a rotating lock barrel, a key adapted to enter same and having a beveled end portion, means connected to the barrel for locking the steering mechanism of an automobile, spring contact plates forming part of an ignition circuit, and a pin working transversely through the barrel, and engaging one of said plates, said pin being forced outwardly by the key and by rotation of the barrel, bringing said plates into contact.

2. In a device of the kind described the combination between a steering shaft having a toothed wheel fixed thereon and spring contact plates forming parts of an electric circuit, and a lock mechanism adapted to hold said plates in contact while the steering mechanism is unlocked and to lock said steering mechanism when the plates are separated, said means including a key which actuates circuit closing means when in the lock, and which brings the steering shaft locking means into operative position when the key is in position to be withdrawn from the lock.

3. In a device of the kind described, the combination with a steering shaft, a toothed wheel fixed thereon, a lock barrel, a shaft connected to the barrel, a tooth on the shaft adapted to engage the wheel when the barrel is rotated into key withdrawing position, spring circuit controlling contact plates, a pin working transversely through the barrel and across the keyway and engaging one of said plates, and a key beveled to engage the inner end of the pin and lift the same from the keyway, said key rotating said barrel, and being removable from the barrel to break the circuit and withdrawable therefrom only when said barrel is in position to lock the said steering shaft.

In testimony whereof I affix my signature.

CLAUDE G. McKINNEY.